Sept. 18, 1956

A. W. TYLER ET AL 2,763,192

PHOTOGRAPHIC SENSITOMETER

Filed July 13, 1955

ARTHUR W. TYLER
RALPH E. KLAUSS
INVENTORS

BY Daniel J. Mayne

Karl T. Haramoff
ATTORNEYS

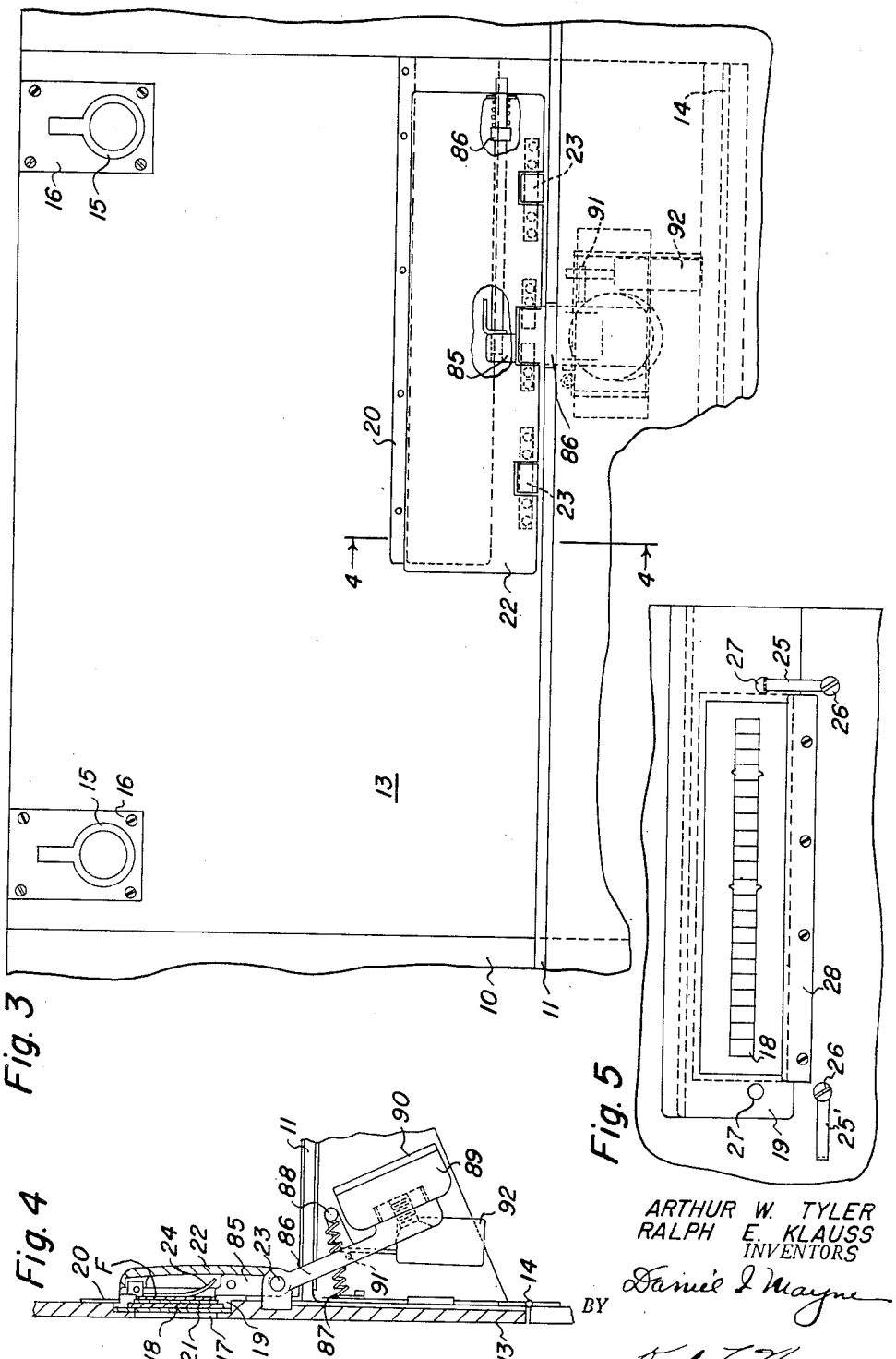

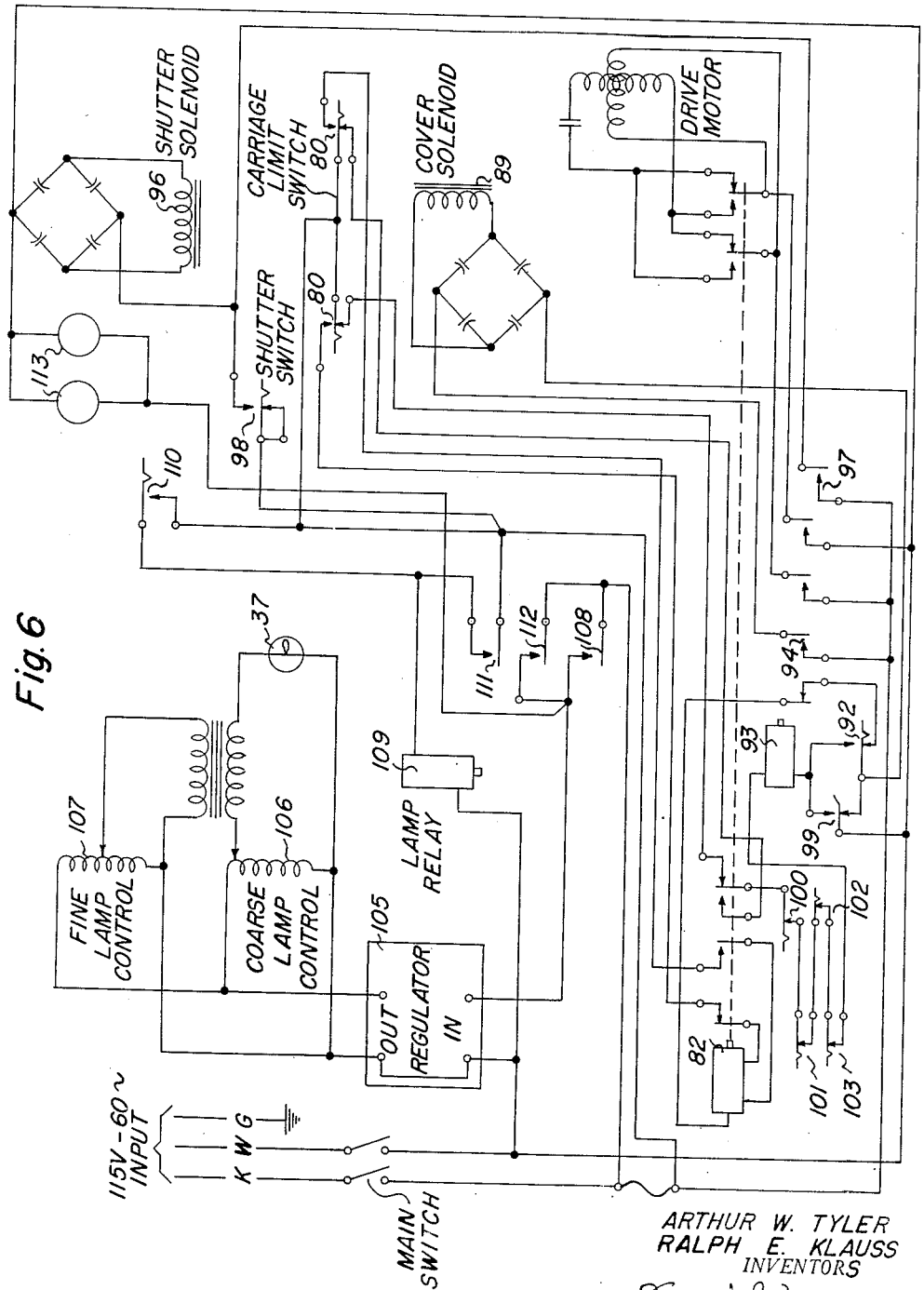

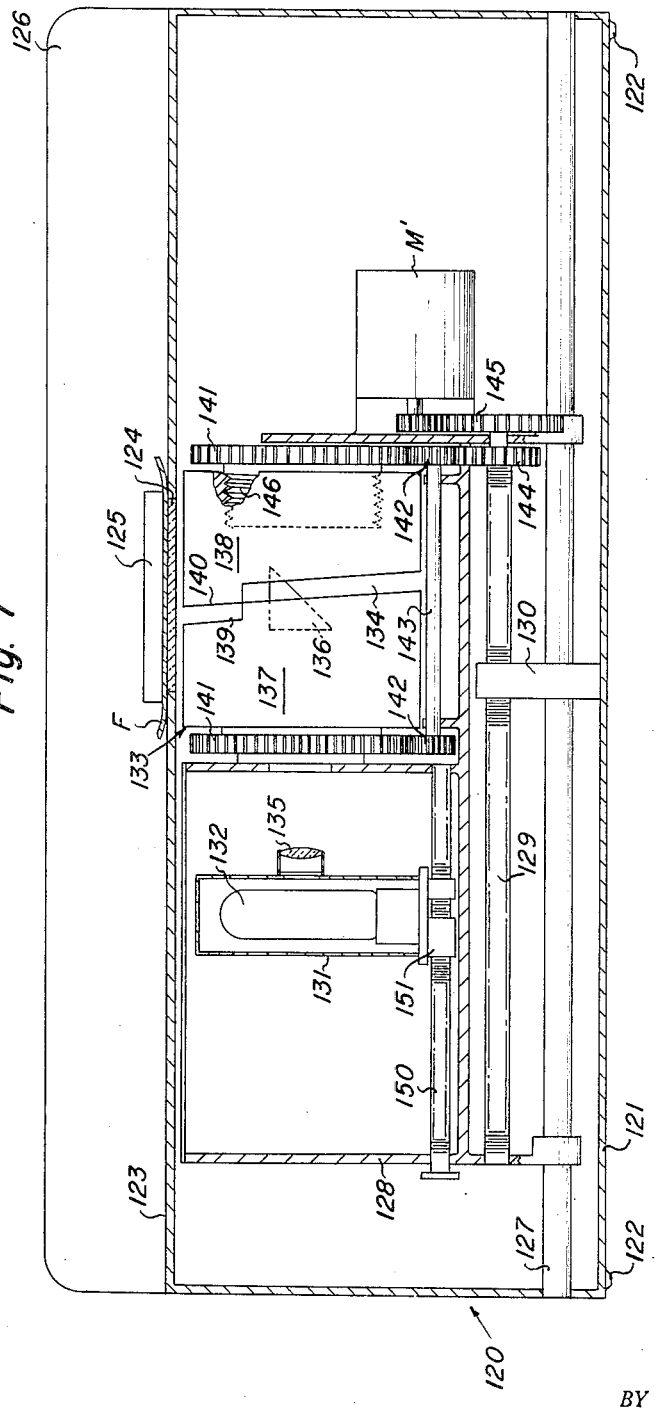

United States Patent Office 2,763,192
Patented Sept. 18, 1956

2,763,192

PHOTOGRAPHIC SENSITOMETER

Arthur W. Tyler, Rochester, and Ralph E. Klauss, Webster, N. Y., assignors to Eastman Kodak Company, Rochester, N. Y., a corporation of New Jersey Application July 13, 1955, Serial No. 521,779

6 Claims. (Cl. 95—10)

The present invention relates to photography, and particularly to a sensitometer for making sensitometric test strips from a photographic film for use in the practice of sensitometry.

Normally sensitometers are adapted to expose sensitized material in the form of strips in a stepped fashion so that a standard test strip will have twenty-one different and equal steps, each of which differs in density from the preceding one by an equal amount. In most sensitometric test strips the exposure difference between steps is the square root of two times the previous exposure, which means that the density of the steps vary in 0.15 density increments. While different ways of exposing these test strips have been devised, the one which we are concerned with involves exposing a strip of sensitized material through a sensitometric step tablet or optical wedge which is held substantially in contact with the sensitized material while a light of given intensity is directed directly onto the step tablet. If the step tablet is composed of twenty-one steps which vary by 0.15 increments of density from one to the other, and each step is given the same exposure, then a sensitometric test strip will be produced which will be a positive of the step tablet. One of the problems presented by this method of making sensitometric test strips is obtaining an equal and desired exposure on each step. Where all of the steps are exposed at one time by a single light source, difficulty is encountered in getting equal amounts of light to all of the steps on the tablet. This problem increases as the range of the test tablet is expanded and its length increases so that such exposure techniques have not been satisfactory where test strips having twenty-one steps each 0.40 inch long are used and in which case the over-all length of the exposed area of the test strip is 8.4 inches long.

Therefore, the primary object of the present invention is to provide a sensitometer having a wide range intensity scale and by means of which a twenty-one step sensitometric test strip can be made in which the individual steps of the sensitometric step tablet are given equal exposures in succession.

Another object is to provide a sensitometer of the type mentioned in which each step of the tablet is exposed successively and for the same time to the same source of light by a scanning slit which moves laterally across the step tablet while being transported lengthwise of the tablet.

And a further object is to provide a sensitometer of the type mentioned which is semi-automatic in operation in that all the operator has to do is load the film holder of the instrument with a new test strip and shut the door. The device then starts and continues to operate until the test strip is exposed at which time the device stops and the door of the film holder opens automatically.

The novel features that we consider characteristic of our invention are set forth with particularity in the appended claims. The invention itself, however, both as to its organization and its methods of operation, together with additional advantages thereof, will best be understood from the following description of specific embodiments when read in connection with the accompanying drawings, in which:

Fig. 3 is a partial front view of the sensitometer, and corresponding substantially to the view of Fig. 1, but showing the door carrying the test strip holder closed for operation;

Fig. 4 is a sectional detail taken substantially on line 4—4 of Fig. 3, and showing the manner in which the film holder cover is operated;

Fig. 5 is an elevational detail view with the film holder cover and the film strip removed to show the form of step tablet used and the means for positioning either a 16 mm. or a 35 mm. film strip in covering relation therewith;

Fig. 6 is a schematic wiring diagram of the sensitometer; and

Fig. 7 is a horizontal sectional view showing another modification of the present invention.

Figure 1:
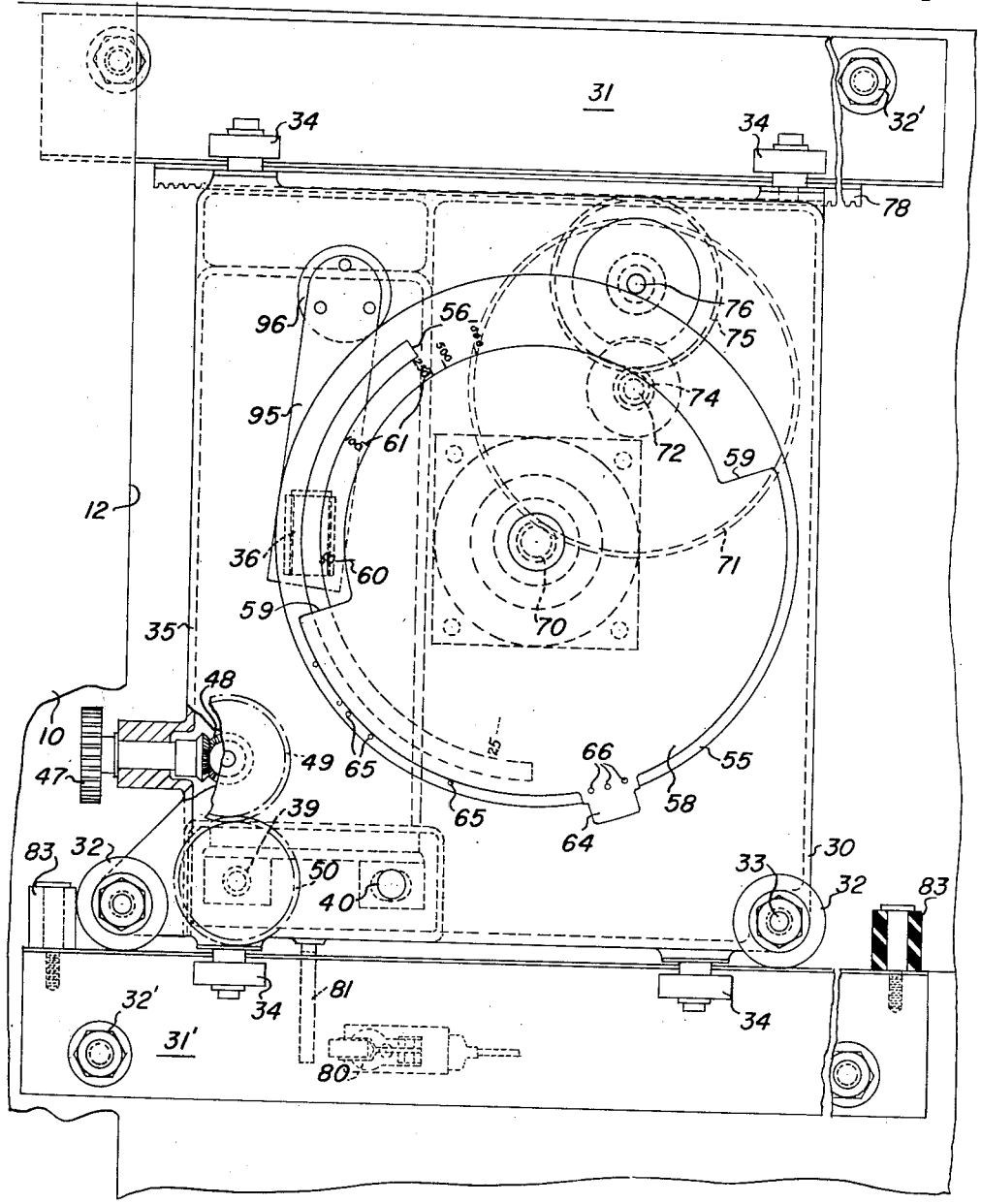
Fig. 1 is a partial front view of a sensitometer constructed in acordance with one embodiment of the present invention, and showing the door on the front vertical wall removed, and the wall partially broken away, to reveal the carriage for the timing disk, the lamphouse, and driving motor.

In general, the sensitometer, according to the present invention, comprises an enclosed cabinet on the vertical front wall of which a test strip of film is held in contact with a sensitometric step tablet extending lengthwise of the cabinet. By closing the film holder cover, the instrument drive motor is started. The carriage supporting the exposing lamp, timing disk, etc. is transported from one end of the step tablet to the other, at which time the exposure cycle is completed. The film holder cover automatically opens and must be closed again before the next cycle can be started. If it is desired to view the step tablet as it is being scanned by the lamp, a latch on the film holder cover permits the operator to place the cover in a horizontal position. The drive motor must then be operated by a separate motor jog switch mounted on the control panel.

Exposure of the film strip is performed one step at a time by a scanning slit which moves laterally across the step tablet. The exposure time may be changed by lengthening or shortening the scanning slit, which is an adjustable helical slit in a disk driven by a reversible hysteresis synchronous motor. The lamp, disk and other associated parts are transported lengthwise of the step tablet in synchronism with the rotation of the disk so that the rotating slit aperture scans across each step of the step tablet in succession. The type and intensity of the light at the exposure plane may be varied by the use of interchangeable lamps, by the insertion of conversion filters and/or by changing the lamp-to-exposure plane distance. Between the lamphouse and the exposure plane there is a black shutter for cutting the light from the exposure plane when the drive motor is not in operation. This shutter opens automatically during exposure of the film.

Referring now to the drawings, this sensitometer comprises a light-tight housing including the vertical front wall 10 interrupted by a horizontal table portion 11. An opening 12 in the front wall is adapted to be closed by a door 13 hinged below the table portion at 14, see Fig. 3, so that it can be opened to provide access to the interior of the housing for adjusting the length of the scanning slit in the timing disk as will be later explained. This door is controlled by a pair of finger latches 15 which normally seat in recesses in the latch plates 16. Since the door 13 is hinged below the tablet portion 11, a part of this table portion is fixed to the door and is separated from the remainder thereof so as to drop down as the door is opened.

Looking at Figs. 3, 4 and 5, the vertical front wall 10 is provided with an elongated opening 17 which is covered by a step tablet 18 carried by a frame 19 removably held in place by gibs 20 which slidably engage the edges of the frame. The side of the step tablet toward the inside of the housing is protected by a cover glass 21. Lengthwise on the step tablet there are twenty-one equal steps with 0.15 density increments to give a 3.00 log exposure range. In this instance the steps of tablet 21 are each 0.40 inch long and 0.40 inch wide although they can be of any size. A strip of light-sensitive film F which is to be exposed through this tablet and become a sensitometric test strip is held in face-to-face contact with the tablet of a film holder cover 22 hinged at 23 to the front wall 10 of the housing to move between a closed film holding position shown in Fig. 4 and an open film loading position not shown. The underside of the cover is provided with a pair of film holding spring clips 24, one adjacent each end, which are adapted to hold the film firmly in contact with the tablet. The film holder is provided with two sets of guides so that 16 mm. or 35 mm. film strips may be properly located in the film holder. When 16 mm. film strips are to be used, the two arms 25 and 25', which are pivoted to the front wall at their lower ends 26, are swung to the vertical position, in which only arm 25 is shown, and in which position the top edges of the arms serve as supports for the edge of a 16 mm. film strip. Rounded ends on these arms enter depressions 27 in the step tablet frame 19 to frictionally hold these arms in their vertical positions. A 35 mm. film strip is adapted to be supported by guide bar 28 fastened to the front wall 10 when arms 25 and 25' are lowered to their horizontal position in which arm 25' is shown.

Movably mounted within the housing to be driven lengthwise of the step tablet is a carriage 30. The supporting means for this carriage comprises a pair of vertically aligned and vertically spaced fixed guide bars 31 and 31' which are fastened by bolts 32' to supporting webs within the housing, said bars extending parallel to the front wall 10. At each of its lower corners the carriage 30 has a roller 32 mounted on a horizontal axle 33 extending perpendicular to the front wall and these rollers engage the top of guide bar 31' to permit the carriage to move back and forth in the housing. The carriage 30 is hung on the bars 31 and 31' by means of four pairs of rollers 34 located at each corner of the carriage and carried by vertical axles, one roller of each pair engaging opposing vertical faces of the bars 31 or 31'. These rollers permit free movement of the carriage along the guide bars but prevent it from falling away therefrom.

Supported on the carriage is a light-tight lamphouse 35 having a window 36 in its front wall in alignment with the film holder. An incandescent lamp 37 is adjustably positioned within the lamphouse with its filament substantially in horizontal alignment with the window. No optical elements are used in this embodiment and the light passing directly from the lamp 37 through the window 36 to the step tablet is used for exposure purposes. To permit adjustment of the lamp-to-focal plane distance as one means of varying the light intensity, the lamp is mounted in a socket 38 supported by parallel spaced rods 39 and 40 extending rearwardly from the front wall. One of these rods, in this instance 39, is threaded and is engaged by a pair of nuts 41 fixed to a base plate 42 to which the socket is clamped by screw 43. Also carried by the base plate 42, but not shown, are a pair of smooth bearings which slidably engage rod 40. To take any backlash out of the threaded engagement between the nuts 41 and the threaded rod 49, a second pair of nuts 44 may be located between nuts 41 which are normally urged apart by a compression spring 45. The nuts 41 and 44 are held against relative rotation by pins 46 extending from one into a hole in the other.

Figure 2:
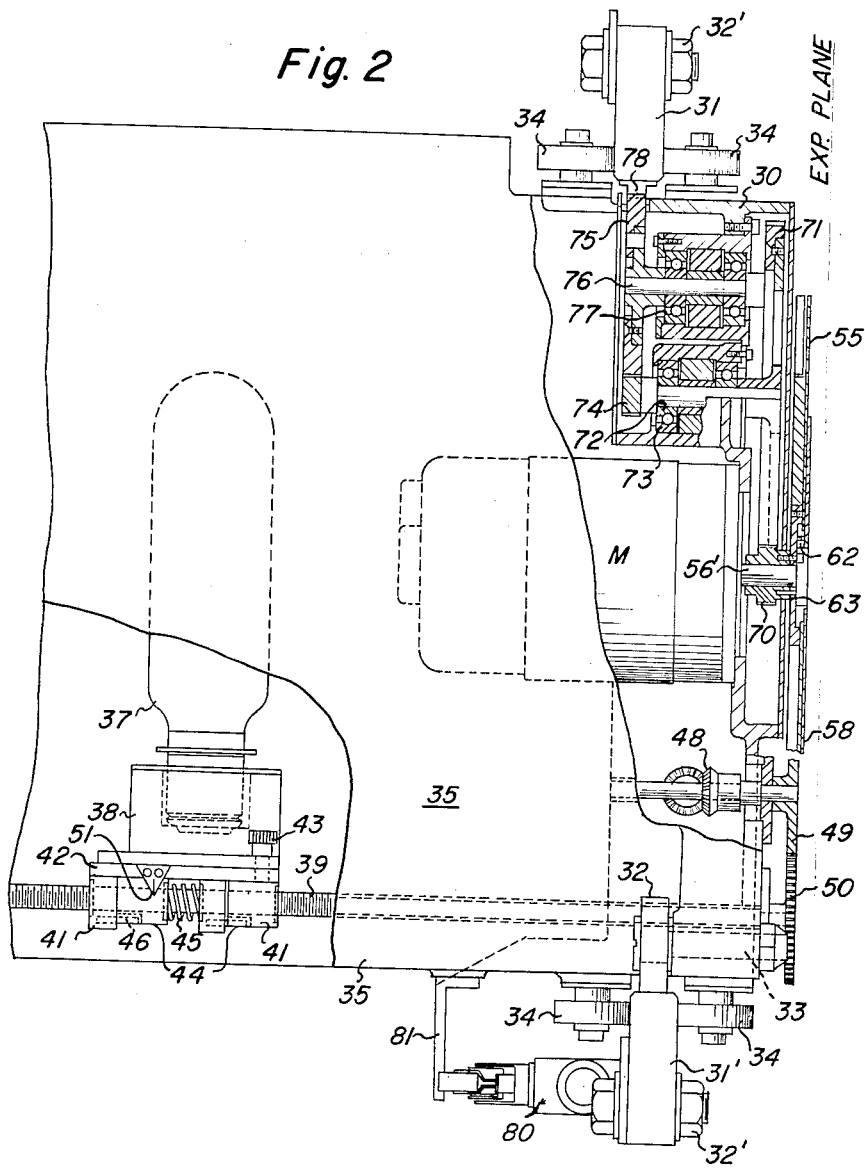
Fig. 2 is a partial side view of the carriage in the sensitometer with the walls of the lamphouse broken away and with the drive for the carriage and the timing disk shown in section.

The position of the lamp is capable of being critically adjusted from outside of the lamphouse by turning knob 47. Such adjustment is transmitted through bevel gear combination 48 to spur gear 49 which in turn engages a gear 50 fixed to the end of threaded rod 39. This causes threaded rod 39 to turn whereupon the lamp 37 is moved toward and from the exposure plane. This adjustment is made through a door, not shown, in one end of the housing and with the side wall of the lamphouse removed. The position of the lamp is indicated by a pointer 51 which cooperates with a scale, not shown, which is mounted within the lamphouse and extends parallel to the threaded rod 39. This scale has been omitted for the reason that it would cover the rod 39 and prevent showing the connection between this rod and the lamp socket support. The passage of exposing light through the window 36 of the lamphouse 35 and to the step tablet 18 is controlled by a shutter or timing disk 55 which is mounted on the end of the shaft 56' of a reversible hysteresis synchronous motor M also carried by the carriage 30. This disk is provided with a helical scanning slit 56 which is equal in width to the length of the steps on the step tablet, in this case 0.40 inch. This slit 56 effectively constitutes the exposure aperture for the steps of the tablet and the disk 55 is located as closely to the exposure plane as is practically possible so that there will be no undesirable spill-over of light from one step to the next on the test strip exposed through the step tablet. The length of the scanning slit 56 can be adjusted to give different times of exposure. To this end a second disk 58 is rotatably mounted on the face of disk 55. As shown in Fig. 1, this second disk has a portion whose radius is such as to cover the scanning slit 56 and another portion whose radius is small enough to uncover the scanning slit. These two portions are connected by straight edges 59 which extend substantially radially of the disk and on edges which define one end of the scanning slit when disk 58 is adjusted on disk 55 so as to cover part of the scanning slit. The speed of rotation of the disk 55 and the length of the slit 56 determine the time of exposure for each step of the film strip and, as indicated in Fig. 1, by adjusting disk 58 over disk 55 exposures from $\frac{1}{25}$ of a second to $\frac{1}{1000}$ of a second are possible. The exposure time of a given adjustment is indicated by an index line 60 on disk 58 cooperating with one of several marked index lines 61 on disk 55. To permit disk 58 to be adjusted relative to disk 55, the center of disk 58 is fastened to a flanged hub 62, the flange of which is rotatably confined in a recess in a dished hub 63 on the motor shaft by the disk 58 which is fixed to said hub 63, see Fig. 2. To adjust the length of slit 56, the finger tab 64 on the edge of disk 58 is grasped and lifted enough, by deforming disk 58 which is made of light metal, to disengage a pin 65 extending up from the face of disk 55 from one of three holes 66 in the finger tab. When this positive connection is broken between the two disks, then disk 58 can be adjusted relative to disk 55 to produce a scanning slit of a desired length. Then when disk 58 is released, one of the holes 66 will engage a corresponding pin 65 to positively connect the two disks together and the adjusted length of the slit 56 will be maintained during the time the device is driven. To prevent the disk 58 from being accidentally raised from disk 55 far enough to permanently deform it, the underside of the finger tab 64 is provided with a right-angle bracket, not shown, which overhangs the edge of disk 55 and permits disk 58 to be pulled away therefrom only far enough to disengage the pin 65 from the hole 66.

The pitch of the helical scanning slit 56 is equal to the length of the steps of the step tablet so that if the slit was extended through 360°, then opposite ends thereof would align with two adjacent steps on the tablet. The carriage 30 is driven lengthwise of the step tablet at such a rate that the disk 55 makes one revolution for each 0.40 inch travel of the carriage, and hence the disk 55, along the tablet. Accordingly, by virtue of the helical nature of the slit 56, each step of the tablet sees light through the slit 56 as though the exposure aperture formed thereby were stationary. The carriage 30 is driven along the step tablet by the same motor M which rotates the disk 55 by virtue of gearing which will now be described. Looking at Figs. 1 and 2, a pinion 70 fixed to the motor shaft behind disk 55 engages a large spur gear 71 carried by shaft 72 mounted in roller bearings 73. A pinion 74 fixed to the inner end of shaft 72 engages a spur gear 75 carried by a shaft 76 mounted in roller bearings 77. This spur gear 75 meshes with a rack 78 fixed to the underside of guide bar 31. Since the rack 78 is stationary, this means that rotation of the spur gear 75 engaging the same must cause the carriage 30 to move along the rack and hence along the step tablet. The ratio of the gearing between motor M and rack 78 is such that the carriage 30 moves 0.40 inch along the step tablet during each revolution of the disk 55.

One complete exposure of a sensitometric film strip is accomplished when the carriage 30 makes one pass across the step tablet and the disk 55 makes at least twenty-one revolutions (one for each step of the tablet). When the carriage 30 reaches either of its limits, and the exposure of a sensitometric strip has been completed, one of two carriage limit switches 80 mounted on the side of the lower guide bar 31' is operated by an arm 81 fixed to and extending downwardly from the bottom of the carriage. As will be seen by looking at the wiring diagram of Fig. 6, this will stop the motor M and actuate a motor reversing relay 82 to reverse the direction of drive of the carriage. Bumpers 83 are also provided at each end of guide bar 31' which are adapted to be engaged by rollers 32 to positively limit the travel of the carriage in each direction. The motor drive is normally started by closing the film holder cover and the cover automatically opens at the end of an exposure. This is accomplished by detachably connecting the cover 22 to the holding bar 85 extending from an arm 86 pivoted to the same hinge point 23 as the cover but independently of the cover. The cover 22 is detachably connected to the holding bar 85 by a spring-loaded latch pin 86 slidably mounted on the underside of the cover and adapted to extend into a hole in the holding bar. The cover is normally moved to an open position by a spring 87 fastened at one end to the door 13 and at the other end to a pin 88 fixed to a lug on arm 86, see Fig. 4. The cover is held in a closed position by an electromagnet 89 carried on the end of arm 86 which engages a soft iron plate 90 fixed to a part of the door 13 below the horizontal table portion 11. A pin 91 extending from the arm 86 operates a double-pole switch 92 when the cover is closed to both energize the electromagnet and complete the motor circuit, see Fig. 6. When the carriage 30 operates either one of the limit switches 80, the circuit to the motor start relay 93 is de-energized and this cuts power from the electromagnet by allowing switch 94 to open whereupon the film holder cover 22 is automatically opened by spring 87 and cover switch 92 moves to its normally open position in which it opens the circuit to the motor start relay 93.

Directly behind the timing disk 55 there is a pivoted opaque shutter 95 which is swung to a closed position in covering relation with the window 36 of the lamphouse when the drive motor is not in operation. This shutter is operatively connected to a rotary solenoid 96 which when energized swings the shutter to an open position. The circuit to this rotary solenoid 96 is completed when switch 97 of the motor start relay 93 is closed, see Fig. 6. The shutter 95 can be manually opened when the film holder cover is opened by closing a manually operated switch 98 which will be mounted on a control panel. This switch will be used when it is desired to check the lamp to see if it is burning or to check the synchronization of the timing disk slit 56 with the steps of the tablet prior to making an exposure. At this time the film holder cover may be laid open to its full open (horizontal) position by unlatching it from holding bar 85 and the carriage can be advanced by operating the motor jog switch 99. The carriage may be moved small increments by jogging, or, when switch 99 is held closed, the carriage will travel to either limit depending upon its previous position, at which time it will stop.

The several doors in the housing, including front door 13, which provide access to the interior for adjusting the length of the slit 56 in the timing disk, for adjusting or changing the lamp, for making repairs, etc. are provided with safety switches which will stop the carriage drive should any one of the doors be opened. None of these switches have been shown on the apparatus per se but are indicated as interlock switches 100–103 in series with the motor start relay in the wiring diagram of Fig. 6.

As shown in the wiring diagram, the lamp circuit may include a voltage regulator 105 and coarse and fine variacs 106 and 107, respectively, for adjusting the lamp currents. The lamp circuit is controlled by switch 108 of lamp relay 109 which is energized by actuation of manual switch 110. Relay 109 is held energized upon operation of hold-in switch 111 so that manual switch 110 need only be momentarily closed. Switch 112 of relay 109 closes the circuit to two blowers 113 which serve to cool the lamp during the time it is on.

Operation of this sensitometer is as follows: The film holder is loaded with a strip of film by sliding the strip down in front of the step tablet 18 behind the two spring clips 24 of the film holder cover 22. The film strip is slid down so that its bottom edge rests on the stops 25 and 25' if a 16 mm. film is used or guide bar 28 if a 35 mm. strip is used. The film holder cover 22 is then pressed closed and released. This starts the drive motor M and the cover 22 is held closed by electromagnet 89 which is now energized. The cover 22 will remain closed until the carriage 30 completes one cycle of travel across the step tablet at which time the motor M will be stopped and set for reverse operation, the electromagnet 89 will be de-energized and cover 22 will be automatically opened by spring 87. If another film is to be exposed, then it will be placed in the film holder, the cover will again be closed and the operation will be the same as before only the carriage will move in the opposite direction in exposing the film strip.

In Fig. 7 we have shown another embodiment of our invention which operates on the same principle but uses a cylindrical timing shutter which has an adjustable helical scanning slit in its periphery. This particular type of timing shutter possesses the advantage that a much greater range of exposures can be obtained therewith since the scanning slit can be made 360° long or the width of the slit can be made equal to the length of two or more steps of the step tablet whereby the exposure can be increased to relatively long periods.

This embodiment of sensitometer comprises a light-tight stationary housing 120, the bottom wall 121 of which is provided with feet 122 on which the instrument rests. The housing includes a horizontal working surface 123 in which the elongated twenty-one step sensitometric step tablet 124 is positioned and in contact with which a strip of film F is adapted to be held by a film holder cover 125. On an inclined wall 126 behind the horizontal working surface the necessary control knobs, not shown, are mounted.

Slidably mounted on a pair of stationary guide rods 127 within the housing there is a carriage 128. This carriage supports a rotatable driving screw 129 which is in threaded engagement with a nut member 130 fixed to the bottom wall of the housing so that rotation of the screw causes the carriage to be driven within the housing and lengthwise of the step tablet. Movable with the carriage 128 is a lamphouse 131 in which there is located an incandescent lamp 132 and a timing drum or shutter 133 having a helical scanning slit 134 which moves along the step tablet as the carriage is moved. Light from the lamphouse is directed by lens 135 and prism 136 within drum 133 through the scanning slit.

As before, the exposure of the film strip F is performed one step at a time by the scanning slit 134 which moves laterally across the sensitometric step tablet 124. This principle is accomplished by the helical scanning slit 134 mounted in the drum which is driven by a synchronous reversible motor M'. The lamp, scanning drum and other associated parts of the optical system are transported lengthwise of the step tablet in synchronism with the rotation of the drum so that the rotating aperture scans across each step of the step tablet in succession. The exposure time may be changed by lengthening or shortening the scanning slit. To accomplish this, the drum is composed of two mating parts 137 and 138 with mating edges 139 and 140 being helical in shape. Each mating part is provided with a large gear 141 connected thereto which is in turn engaged by one or the other of pinions 142 carried by a shaft 143. This shaft 143 is driven by a spur gear 144 which is fixed to the end of threaded rod 129 whereby the scanning drum is rotated and the carriage is transported at the same time and in synchronism. A suitable reduction gearing 145 connects the gear 144 to the reversible motor M'.

To permit adjustment of the length of the scanning slit 134, one of the mating parts 138 has a threaded connection 146 with a hub portion carried by its respective gear 141. If the pitch of the threads in this connection 146 is equal to the pitch of the scanning slit, then by rotating section 138 relative to section 137 the length of the scanning slit can be changed to vary the exposure. With this construction the length of the scanning slit 134 may be made equal to 360° of the drum, or if the section 138 is capable of an adjustment of a multiple of turns relative to section 137, the width of the slit can be made equal to multiples of the length of the steps on the step tablet and the explosure can be increased up to values of one-half second or more. The exposure can also be varied by changing the intensity of the light either by changing the lamp or by changing the lamp-to-exposure plane distance by adjustment of screw 150 which a threaded nut 151 on the lamphouse base engages. The time of exposure can also be further varied by changing the set of gears in the motor drive.

Although we have shown and described certain specific embodiments of our invention, we are aware that many modifications thereof are possible. Our invention, therefore, is not to be restricted to the particular construction shown and described herein but is intended to cover all modifications coming within the scope of the appended claims.

Having thus described our invention, what we claim is new and desire to secure by Letters Patent of the United States is:

1. A sensitometer comprising in combination a housing provided with an elongated window in one wall thereof, a sensitometric step tablet covering said window and in surface contact with which a light-sensitive sensitometric strip is adapted to be held, a carriage mounted within said housing to move lengthwise of said window, means including a light source spaced from said sensitometric tablet for directing a beam of light toward said tablet mounted on said carriage, a rotatable shutter adapted to intercept the beam of light directed toward said tablet and mounted on said carriage, said shutter provided with a helical slot having a width equal to the length of the individual steps of said tablet and whose pitch extends lengthwise of said tablet, and means for continuously rotating said shutter and continuously driving said carriage lengthwise of the tablet at such relative speeds that the shutter makes one revolution while the carriage is moving a distance equal to the length of one step of said tablet.

2. A sensitometer according to claim 1, and including means for adjusting the length of said helical slot to alter the time of exposure given each step of said sensitometric strip.

3. A sensitometer according to claim 1, characterized by the fact that the prime mover for driving said shutter and carriage comprises a reversible electric motor, and means for automatically stopping said motor and reversing the circuit thereto when the carriage reaches each end of its travel.

4. A sensitometer according to claim 1 characterized by the fact that the prime mover for driving said shutter and carriage comprises a reversible electric motor, a control circuit for said motor including means for reversing the power circuit to said motor, a pair of limit switches for energizing said last-mentioned means and arranged at opposite ends of the path of travel of said carriage to be engaged and operated thereby to reverse the motor as the carriage reaches either end of its travel, a door pivoted on said housing to move to and from an operative position wherein it holds said sensitometric strip in surface contact with said sensitometric step tablet, means normally moving said door from said operative position, an electromagnetic means for holding said door in an operative position, means for deenergizing said electromagnetic means when the drive motor is stopped, and a switch controlled by closing said door for starting said motor and energizing said electro-magnetic means.

5. A sensitometer according to claim 1 characterized by the fact that said rotatable shutter comprises a disk whose axis of rotation is perpendicular to said step tablet, and whose slot expands radially of said disk, a second disk adjustably mounted on the face of said first disk and provided with an arcuate cutout at least as long as said slot whereby the effective length of said slot may be varied to change the time of exposure.

6. A sensitometer according to claim 1 characterized by the fact that said rotatable shutter comprises a drum whose axis of rotation is substantially parallel to said step tablet, said drum comprising two cylinders in abutting relation, the adjacent ends of said cylinders being helical in form with a pitch equal to the length of the individual steps of said tablet to form said helical slot, means for rotating one cylinder relative to the other to adjust the effective length of said slot, and means for rotating both of said cylinders individually and in synchronism to maintain said slot as adjusted.

No references cited.